United States Patent [19]
Riead

[11] Patent Number: 5,229,174
[45] Date of Patent: Jul. 20, 1993

[54] AUTOMOTIVE BODY SIDE MOLDING WITH MARKING SURFACE

[76] Inventor: Kenneth C. Riead, 2501 W. Vesper, Blue Springs, Mo. 64015

[21] Appl. No.: 823,339
[22] Filed: Jan. 21, 1992
[51] Int. Cl.⁵ .............................. B60R 13/04
[52] U.S. Cl. ........................ 428/31; 293/128
[58] Field of Search ................ 428/31; 293/128

[56] References Cited

U.S. PATENT DOCUMENTS 3,935,365  1/1976  Eigenmann ..................... 428/323
4,010,297  3/1977  Wenrick ............................ 428/31

Primary Examiner—Henry F. Epstein

[57] ABSTRACT

An automobile trim molding is provided which contains a plurality of marking elements positioned on a base strip. The marking elements are constructed to mar the surface of an object encountering the molding with a sufficient force so that a person opening a vehicle door will exercise a greater degree of caution to insure that the door is not damaged by encountering the molding. A resilient outer member may be applied over the marking elements so that the marking elements are not visually observable when the molding is applied to a vehicle.

18 Claims, 2 Drawing Sheets

AUTOMOTIVE BODY SIDE MOLDING WITH MARKING SURFACE

BACKGROUND OF THE INVENTION

This invention relates in general to automobile accessories and, more particularly, to a body side molding designed to protect a vehicle from damage resulting from the swinging of a vehicle door into the side of the protected vehicle.

Some vehicle owners go to great lengths in an attempt to protect their vehicle from being damaged by individuals opening the doors on adjacently parked automobiles. For example, the owner may park the vehicle far away from or at an angle to other automobiles or the owner may utilize two marked parking slots instead of one. Despite even the most extensive of such precautions, the vehicle will invariably receive a "door ding" as a result of an inconsiderate or inattentive person opening the door on an adjacently parked car or truck.

Automobile and after-market accessory manufacturers have utilized resilient body side moldings in an attempt to protect vehicles from acquiring door dings. Unfortunately, the presence of such moldings may actually contribute to the incidence of door dings because drivers or passengers exiting vehicles may assume that the molding will adequately protect the adjacent vehicle. The individuals are thus likely to allow their doors to swing into the vehicle with a greater force than they otherwise might if the adjacent vehicle were unprotected or if damage were likely to result to their own car.

Sometimes even the most attentive and considerate individuals will allow their door to lightly contact an adjacently parked vehicle because they assume that the molding will absorb the contacting force and will protect the vehicle. However, due to the different sizes and configurations of vehicles, the molding is often located in a position which does not offer protection from doors on certain vehicles. If the opening door should hit the other vehicle side panel instead of the molding, even a small impact force may scratch or chip the paint or otherwise damage the vehicle. Moreover, even if the automobile molding is properly positioned to receive the impact from the door being opened, the impact force may be large enough to damage the molding and possibly the underlying vehicle body as well.

SUMMARY OF THE INVENTION

It is an object of this invention to provide a vehicle body side molding for protecting a vehicle to which it is applied from damage resulting from the opening of a car door into the vehicle, and which molding can also cause damage to the door being opened so that individuals will exercise a greater degree of caution when opening their doors in order to avoid the possibility of damaging their own vehicles.

As a corollary to the preceding object, it is another objective of this invention to provide a molding which can cause damage to an impacting object but which will not snag the clothing or injure a person brushing against the molding so that the likelihood of injury to a person accidentally contacting the molding is greatly reduced.

It is also an object of this invention to provide a vehicle body side molding having exteriorly visible elements that will mar an object encountering such elements so that a person is alerted to the presence of such elements and will exercise a greater degree of care such as when opening a vehicle door to insure that the door does not swing into the molding.

It is a further object of this invention to provide a vehicle body side molding which has the appearance of a conventional molding but which contains interior elements that will pierce the resilient exterior strip on the molding when the molding is impacted, such as by the door of an adjacently parked vehicle, so that the individual opening such door cannot tell simply by observing the molding whether or not it contains the piercing elements and thus will be more likely to always exercise caution when opening the door because of the possible damage that might be inflicted to the door by the molding.

It is a still further object of this invention to provide a vehicle body side molding which protects the vehicle from door dings and has the appearance of a conventional molding but which contains elements that will cause damage to a car door impacting such molding so that the vehicle to which the molding is applied will have an added measure of protection against receiving door dings.

To accomplish these and other objects of the invention, a body side trim molding for a vehicle is provided which comprises:

an elongated base strip; and a plurality of marking elements positioned on said base strip at a location to project away from said vehicle when the molding is applied thereto, said marking elements being constructed to mar an object impacting said molding with a force above a preselected level.

The molding of the present invention will absorb an impact to protect the vehicle to which it is applied and will also cause damage to the impacting object, typically a door, so that the person opening the door will be forced to exercise greater control over the door during the opening thereof. The marking elements in some embodiments of the invention are visually observable when said molding is applied to a vehicle. In another embodiment, the marking elements are covered by a resilient member through which the marking elements may penetrate when an object such as a car door impacts the resilient outer member with sufficient force. Once the public becomes generally aware of moldings of the present invention, and since some of the molding embodiments contain marking elements which are not visually observable, drivers and passengers will most likely avoid opening vehicle doors into any adjacently parked vehicle.

BRIEF DESCRIPTION OF THE DRAWINGS

In the accompanying drawings which form a part of the specification and are to be read in conjunction therewith, and in which like reference numerals are used to indicate to like parts in the various views.

DESCRIPTION OF THE PREFERRED EMBODIMENTS

Figure 1:
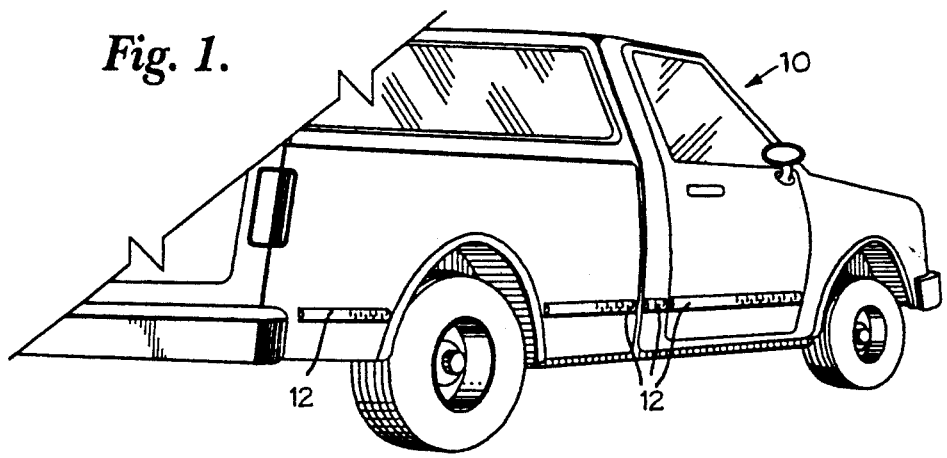
FIG. 1 is a fragmentary side prospective view of a vehicle containing a body side molding in accordance with the present invention.

Referring now to the drawings in greater detail, and initially to FIG. 1, the numeral 10 represents a vehicle on which several lengths of one embodiment of a body side molding 12 in accordance with the present invention are applied. The placement of molding 12 on the vehicle 10 may be varied as desired but the molding should be positioned to protect the side panels of the vehicle from sustaining damage when a door from an adjacently parked vehicle is flung open against vehicle 10.

Figure 2:
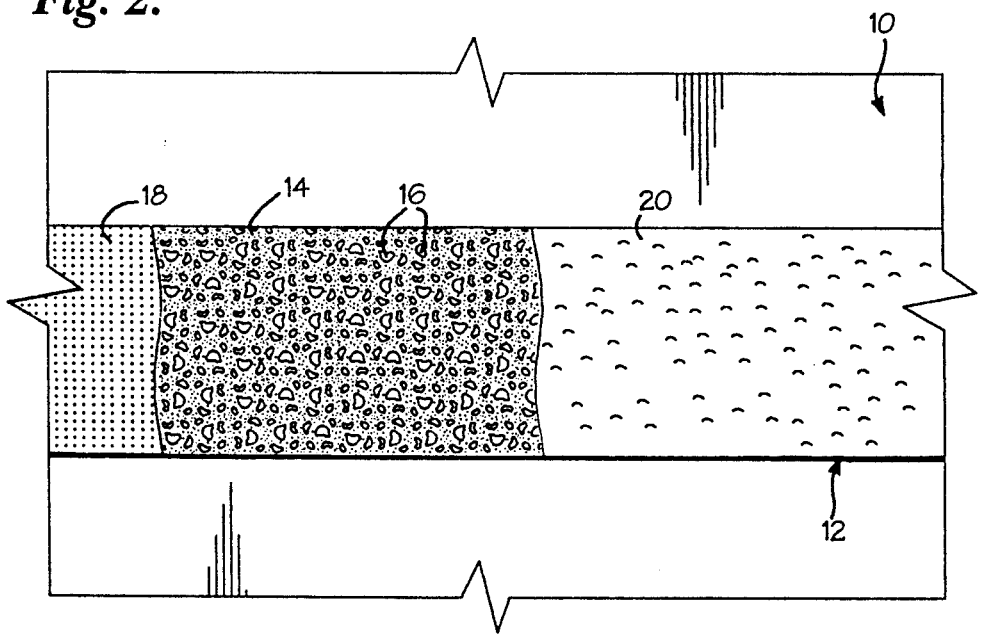
FIG. 2 is a side elevational view, in fragment, of a portion of the vehicle and molding shown in FIG. 1, taken on an enlarged scale and with portions broken away to illustrate the construction of the molding.

As can be seen in FIG. 2, the molding 12 comprises a base strip 14 and a plurality of marking elements 16 which are adhered to one face of the base strip 14. A layer of adhesive 18 is applied to the other face of the base strip for securing the molding 12 to the vehicle 10. It will be appreciated that other types of fasteners instead of adhesives may be used to secure the molding to the vehicle.

The base strip 14 may be formed from rigid materials such as metals and plastics or resilient materials such as various synthetic rubbers, including styrene-butadiene and butyl copolymers. The material selected for the base strip should offer resistance to ultraviolet light degradation and other weathering elements.

The marking elements 16 are intended to mar or otherwise damage an object such as a vehicle door which is swung against the molding 12 with a sufficient force. It will be appreciated that the shape and spacing of the marking elements may be varied to suit particular applications. As illustrated, marking elements 16 comprise sand which is adhered to base strip 14. A thin coating 20 of a material such as a polymer is applied over the marking elements on the base strip to provide a more visually pleasing appearance and to aid in retaining the marking elements 16 in place on the base strip 14. The coating 20 also serves to prevent a person from suffering abrasions when brushing against the molding 12 and prevents the person's clothing from being snagged on the marking elements 16.

It can thus be seen that when molding 12 is applied to vehicle 10, the marking elements 16 will cause damage to the exterior surface of a door from an adjacently parked vehicle when it is swung against the molding 12 with sufficient force. Once the public becomes aware of the existence of trim molding 12 of this type, it is expected that individuals will exercise a greater degree of care and control during the opening of their vehicle doors.

The body side molding 12 serves to both cushion the force received by a careless or inattentive person opening a vehicle door against vehicle 10, but also serves as a deterrent against the uncontrolled opening of such doors. This deterrent effect is achieved by heightening the awareness of that person that damage may be sustained to his or her own vehicle when the door is allowed to contact molding 12. Moreover, awareness of the presence of molding 12 will cause many people to avoid allowing their doors to even lightly contact the vehicle to which the molding is applied. Damage that might otherwise result from even this light contact, such as if a portion of the vehicle itself rather than merely the molding were struck, is thereby prevented.

Figure 3:
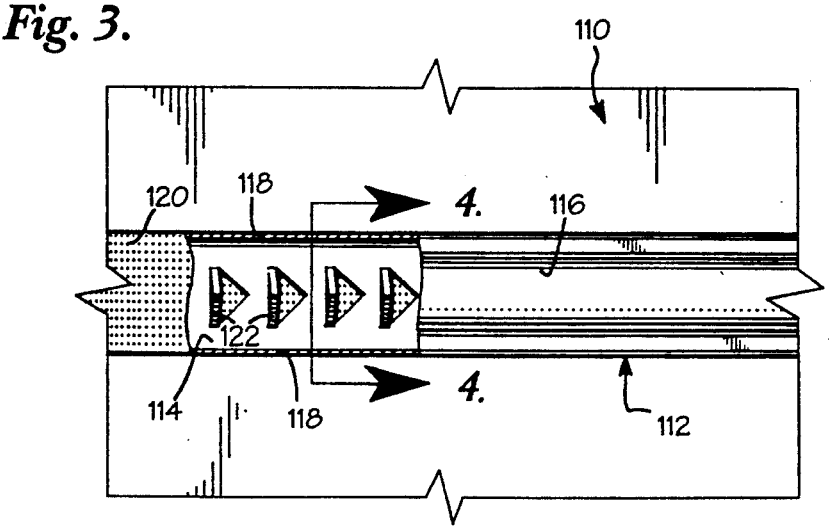
FIG. 3 is a fragmentary, side elevational view of a further embodiment of the body side molding in accordance with the present invention applied to a vehicle door and with portions broken away to show the construction of the molding.
Figure 4:
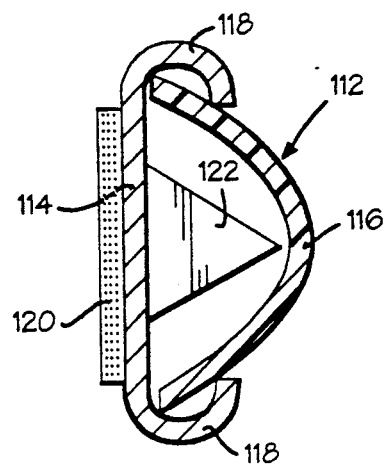
FIG. 4 is an end elevational view of the molding taken in vertical section along line 4—4 of FIG. 3 in the direction of the arrows and shown on an enlarged scale.
Figure 5:
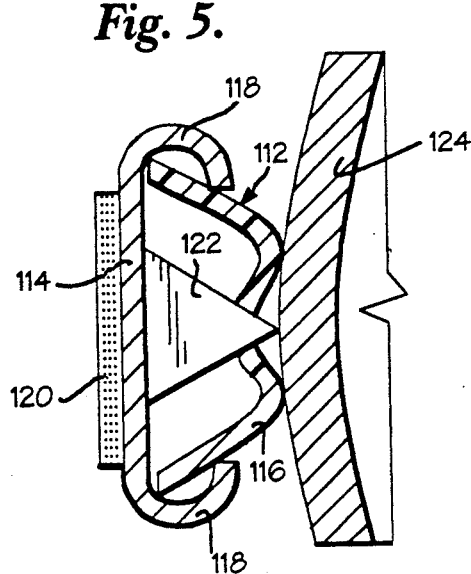
FIG. 5 is an end elevational view in vertical section of the molding shown in FIG. 4 and showing a fragmental portion of a door positioned against the molding and engaging a sharp internal element of the molding that has pierced through the resilient external covering thereof.

A second embodiment of the molding in accordance with the present invention is shown in FIGS. 3-5, with a vehicle side panel being represented by the numeral 110 and a molding represented by the numeral 112. The molding 112 comprises a base strip 114 which is adapted to be placed closest to the vehicle 110, and a resilient outer member 116 which is retained by the base strip 114 in a suitable fashion. The base strip 114 may be formed from rigid materials such as metals and plastics or resilient materials such as various synthetic rubbers, including styrene-butadiene and butyl copolymers. The material selected for the base strip should offer resistance to ultraviolet light degradation and other weathering elements.

As illustrated, the base strip 114 includes a pair of spaced apart, inwardly turned retaining lips 118 which retain and receive the major side edges of the resilient outer member 116. Preferably, the outer member 116 has a vertical or minor dimension which is greater than the distance between lips 118 such that the member 116 bulges outwardly when received by the base strip 114.

The base strip 114 may include a layer of adhesive on that face of the base strip which is to be applied to the vehicle. It will be appreciated that other types of fasteners instead of adhesives may be used to secure the molding 112 to the vehicle 110.

Base strip 114 also includes a plurality of rigid marking elements 122 which extend outwardly from the face of the base strip 114 opposite the face to which the adhesive 120 is applied. The marking elements 122 may comprise any of various shaped elements that will mar an object such as a car door when it is swung against the molding 112 with a sufficient force. As illustrated, the marking elements 122 are designed to pierce the resilient outer member 116 and have a triangular configuration with the sharp apex of the triangle spaced a short distance inwardly from the resilient outer member 116. The marking elements 122 are punched out of the base strip 114 and are folded outwardly to remain an integral part of the base strip. The elements 122 may of course be formed and secured to the base strip 114 in other suitable fashions. Desirably the marking elements 122 are spaced at regular intervals along the longitudinal length of the molding 112. Again, the spacing as well as the configuration of the marking elements 122 may be varied from that shown.

As is best shown in FIG. 5, the marking elements 122 will penetrate the resilient outer member 116 to mar or otherwise damage an object such as a vehicle door 124 which is swung against the molding 112 with sufficient force to cause deformation of the resilient outer member 116. The material selected for the outer member 116 should thus be readily deformable and should allow penetration by the piecing elements 122. Any of various vinyls and synthetic rubbers are suitable for this purpose. It may also be desirable for the elements 122 and outer member 116 to be constructed in a manner which does not allow the elements 122 to penetrate completely or even partially through the outer member 116.

It can thus be seen that when molding 112 is applied to vehicle 110 the marking elements 122 will cause damage to the exterior surface of door 124 from an adjacently parked vehicle when it is swung against the molding 112 with sufficient force. Notably, since the marking elements 122 are hidden by the resilient outer member 116, a visual inspection of the molding 112 will not signal the presence of the marking elements 122 and individuals will be forced to always control the opening of their doors or risk damage to those doors. The incidence of door dents even on cars unprotected by molding 112 should thus be reduced by the presence of molding 112 on some cars.

Figure 6:
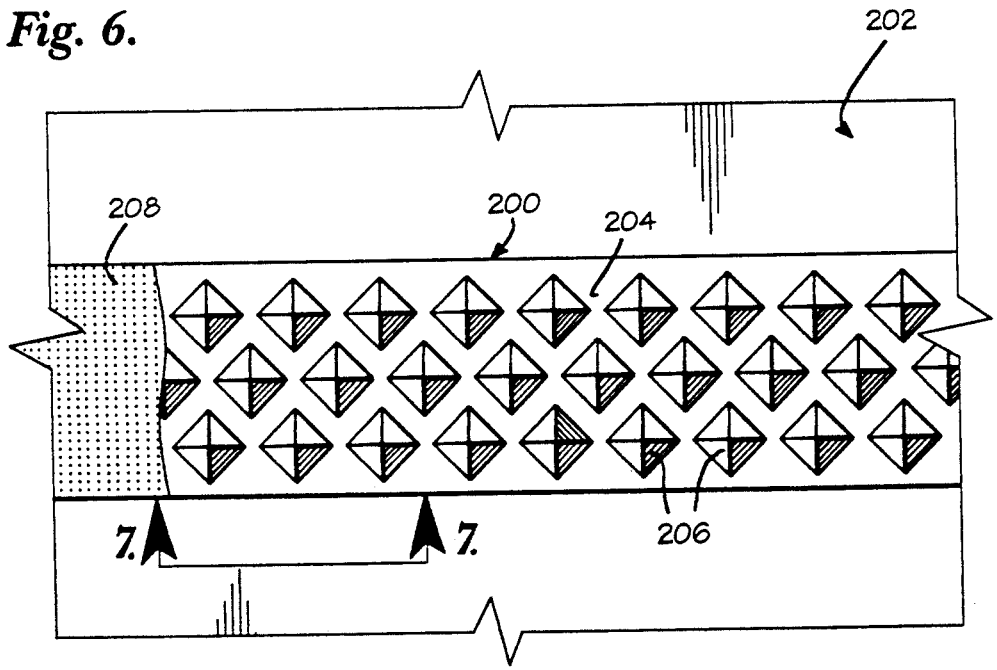
FIG. 6 is a fragmentary, side elevational view of a further embodiment of a body side molding in accordance with the present invention applied to a vehicle door and with portions broken away for purposes of illustration.
Figure 7:
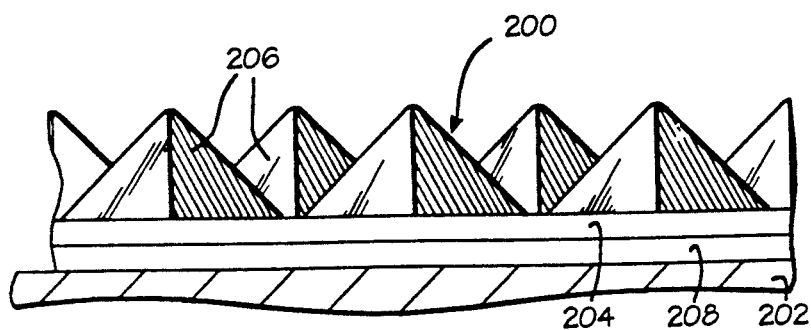
FIG. 7 is a fragmentary sectional view of the molding and vehicle door shown in FIG. 5 and taken along line 7—7 of FIG. 6 in the direction of the arrows.

Turning now to FIGS. 6-7, a still further embodiment of a body side molding in accordance with the present invention is represented broadly by the numeral 200 and is shown applied to a door 202 or other side portion of a vehicle. The molding 200 comprises a base strip 204 on which are mounted a plurality of marking elements 206 which are designed to mark or otherwise damage an object encountering such elements 206 with a predetermined force.

The base strip 204 may comprise any of various suitable weather resistent materials such as metals, plastics, synthetic rubbers and the like. In some applications it may be desirable to form the base strip 204 from a resilient material such as a synthetic rubber so that the molding 200 may be supplied in a roll form from which the desired length of molding may be cut. In other applications, it may be desirable to form the base strip 204 from a rigid metal or plastic such as when the molding 200 is installed during the manufacture of the vehicle. A layer of adhesive 208 or other suitable means can be used to secure one face of the base strip 204 to the vehicle.

The marking elements 206 which are positioned on the face of base strip 204 opposite from adhesive 208 may comprise any of various materials having a hardness sufficient to cause damage to an object impacting such elements with a predetermined force. Each of the marking elements 206 is shaped in the configuration of a pyramid with the base of each such pyramid being secured to the base strip 204. The marking elements 206 are spaced apart in a uniform geometric pattern which presents an aesthetically pleasing visual appearance. The configuration and spacing of the elements 206 may, of course, be varied as desired.

It is important that the spacing between the apex of adjacent marking elements 206 be sufficient so that an impacting force from an object such as a car door is localized to a sufficiently small number of elements 206 to cause the apex of such elements to penetrate into the outer surface of the impacting object. Otherwise, if the impacting force is spread among a large number of marking elements 206, then it is less likely that damage will be inflicted on the impacting object. It is also desirable to slightly round the apex of each marking element 206 to prevent the snagging of an individual's clothing and reduce the likelihood of injury should the individual inadvertently brush against the molding 200 while walking beside the vehicle to which it is applied.

In use, molding 200 is positioned on the vehicle at locations designed to protect the vehicle from receiving damage when a car door, shopping cart or other object impacts the side of the vehicle. In addition to the advantages described with respect to molding 112, the visually observable marking elements 206 on molding 200 are intended to alert individuals opening doors on adjacent vehicles to the possible damage that will be inflicted by the marking elements 206 on such doors they are swung into contact with molding 200. The general public will thus exercise a greater degree of care when exiting cars and other vehicles because of the visual reminder of potential damage offered by the marking elements 206.

It will be appreciated that the marking elements used in the molding of the present invention may assume any of numerous shapes and configurations, such as angular strips running parallel to each other in a repeating pattern which can resemble the theme of the vehicle established by the pattern of the tail-lights, head-lights, or visual treatment(s) of the front, back and/or sides of the vehicle, a crossing or criss-crossing pattern similar to a plaid-type pattern, or any theme or pattern complimenting the vehicle. Advantageously, the molding will appear as though it is "factory" installed.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, what is claimed is:

1. A trim molding for a vehicle, said molding comprising:
   an elongated base strip; and
   a plurality of marking elements positioned on said base strip at a location to project away from said vehicle when the molding is applied thereto, said marking elements being constructed to mar an object impacting said molding with a force above a preselected level.

2. The molding of claim 1, wherein said marking elements are visually observable when said molding is applied to a vehicle.

3. The molding of claim 1, including a resilient member overlying said marking elements.

4. The molding of claim 3, wherein said marking elements are not visually observable when said molding is applied to a vehicle.

5. The molding of claim 3, wherein said marking elements and resilient member are constructed in a manner whereby the marking elements will pierce the resilient member to mar an object impacting said resilient member with a predetermined force.

6. The molding of claim 5, including an adhesive on said base strip for securing said molding to a vehicle.

7. A trim molding for a vehicle, said molding comprising:

an elongated base strip;

a plurality of spaced apart marking elements positioned on said base strip at a location to project away from said vehicle when the molding is applied thereto, said marking elements being constructed to mar an object impacting said molding with a force above a preselected level; and a resilient outer member positioned over the marking elements.

8. The molding of claim 7, wherein said marking elements are visually observable when said molding is applied to a vehicle.

9. The molding of claim 7, wherein said resilient outer member renders said marking elements visually unobservable when said molding is applied to a vehicle.

10. The molding of claim 9, wherein said marking elements and resilient outer member are constructed in a manner whereby the marking elements will pierce the resilient outer member to mar an object impacting said resilient outer member with a predetermined force.

11. The molding of claim 10, including an adhesive on said base strip for securing said molding to a vehicle.

12. A molding for a vehicle, said molding comprising:

an elongated base strip;

a plurality of spaced apart marking elements positioned on said base strip at a location to project away from said vehicle when the molding is applied thereto, said marking elements being constructed to mar an object impacting said molding with a force above a preselected level; and means for securing the base strip to said vehicle.

13. The molding of claim 12, including a resilient outer member positioned over the marking elements.

14. The molding of claim 13, wherein said marking elements are visually observable when said molding is applied to a vehicle.

15. The molding of claim 13, wherein said resilient outer member renders said marking elements visually unobservable when said molding is applied to a vehicle.

16. The molding of claim 15, wherein said marking elements and resilient outer member are constructed in a manner whereby the marking elements will pierce the resilient outer member to mar an object impacting said reliant outer member with a predetermined force.

17. The molding of claim 16, wherein said marking elements are formed from said base strip.

18. The molding of claim 16, wherein said means for securing the base strip to said vehicle comprises an adhesive applied to said base strip.

* * * * *